United States Patent Office 3,637,664
Patented Jan. 25, 1972

3,637,664
N-SUBSTITUTED AMINOALKYL-S, S-DIPHENYL-SULFOXIMINES AND PROCESS FOR THEIR PRODUCTION
Gerhard Satzinger, Gundelfingen, Freiburg, and Peter Stoss, Wildtal, Germany, assignors to Warner-Lambert Company
No Drawing. Filed Dec. 15, 1967, Ser. No. 697,263
Claims priority, application Germany, Dec. 22, 1966, G 48,828
Int. Cl. C07d 41/04
U.S. Cl. 260—239                                 20 Claims

ABSTRACT OF THE DISCLOSURE

The present invention discloses a new class of N-substituted aminoalkyl - S,S - diphenyl-sulfoximines which in their free base form have the following structural formula:

$$O=\underset{C_6H_5}{\overset{C_6H_5}{S}}=N-R \qquad \qquad I$$

wherein R represents a branched, heterocyclic, bicyclic or a polyacidic amino radical, or R represents a radical of the formula:

$$-(CH_2)_n-\overset{R_1}{\underset{}{C}}H-N\overset{R_3}{\underset{R_4}{<}}$$

in which $R_1$ may be hydrogen or lower alkyl, and $R_3$ and $R_4$ may be alkyl or substituted alkyl, or $R_3$ and $R_4$ taken together with the nitrogen atom to which they are attached form a 5- or 6-membered heterocyclic ring system.

These compounds are prepared by treating a suspension of a diphenyl-sulfoximine-alkali metal compound in an anhydrous aromatic hydrocarbon solvent with a compound of the formula $$Hal-R$$

wherein "Hal" is halogen and R is as defined.

These compounds exhibit broncholytic-antispasmodic activity in a mammalian host and are useful in treating conditions generally associated with bronchial diseases.

---

The present invention relates to N-substituted aminoalkyl-S,S-diphenyl-sulfoximines which may be represented by the formula:

$$O=\underset{C_6H_5}{\overset{C_6H_5}{S}}=N-R \qquad \qquad I$$

wherein R represents a branched heterocyclic, bicyclic or polyacidic amino radical. These radicals may be represented by the formulas:

$$CH_2-\underset{\underset{CH_3}{|}}{\overset{\overset{CH_3}{|}}{C}}-CH_2-N\overset{C_2H_5}{\underset{C_2H_5}{<}}$$

$$CH_3-N\overset{}{\underset{-CH_2-CH_2}{\diagdown}}$$

$$CH_3-N\overset{}{\underset{-CH_2-CH_2}{\diagdown}}$$

$$C_2H_5-N\overset{}{\underset{-CHCH_2NCH_3}{\diagdown}}\underset{CH_3}{\overset{}{|}}$$
$$\underset{CH_3}{\overset{CH_2NCH_3}{|}}$$

$$-CH_2CH_2-N\overset{CH_2-CH-CH_2}{\underset{CH_2-CH-CH_2}{<}}\underset{CH_2}{\overset{CH_2}{|}}$$

or R may be represented by a radical of the formula $$-(CH_2)_n-\overset{R_1}{\underset{}{C}}H-N\overset{R_3}{\underset{R_4}{<}}$$

in which $R_1$ may be hydrogen or lower alkyl, and $R_3$ and $R_4$ may be lower alkyl, or substituted alkyl, e.g. phenyl substituted lower alkyl, or $R_3$ and $R_4$ taken together with the nitrogen atom to which they are attached form a 5- or 6-membered heterocyclic ring system, for example, piperidino, morpholino or pyrrolidino, and $n$ is an integer of 1 or 2.

The sulfoximines of this invention may be readily converted to their corresponding acid addition salts or their quaternary ammonium salts. These salts have the general formula:

$$O=\underset{C_6H_5}{\overset{C_6H_5}{S}}=N-R.R_2X \qquad \qquad II$$

and when R is an N-substituted aminoalkyl radical, the salts have the formula:

$$\left[O=\underset{C_6H_5}{\overset{C_6H_5}{S}}=N-(CH_2)_n-\overset{R_1}{\underset{}{C}}H-\overset{R_2}{\underset{R_4}{N}}-R_3^{\oplus}\right]X^-$$

wherein $R_2$ represents hydrogen or lower alkyl and X represents an organic or inorganic anion of a pharmaceutically acceptable acid, for example, chloride, bromide, iodide, nitrate, phosphate, sulfate, acetate, citrate, tartrate, lactate, benzene sulfonate, toluene sulfonate, oxalate, naphthalene sulfonate and the like. These acid addition salts, as well as the quaternary ammonium salts, are also included within the scope of this invention.

In the above definition, lower alkyl is meant to be a $C_1$-$C_7$ straight or branched chain alkyl group, for example, methyl, ethyl, propyl, isopropyl, butyl, pentyl, hexyl and the like.

The symbols R, $R_1$, $R_2$, $R_3$, and $R_4$, X and $n$ as used hereinafter have the same meaning as defined above.

The present invention also includes within its scope a novel process for the production of these sulfoximines.

According to the process of this invention, the N-substituted aminoalkyl-S,S-diphenyl-sulfoximines (I) are prepared by treating a suspension of a diphenyl sulfoximine-alkali metal compound $$\left[\underset{C_6H_5}{\overset{C_6H_5\ \ O}{\underset{/}{\overset{\diagdown\ \|}{S\to N-ME}}}}\right] \qquad III$$

with a compound of the formula $$Hal-R \qquad \qquad IV$$

In the above, "ME" represents an alkali metal, for example, sodium, potassium, lithium, calcium and the like. "Hal" represents a halogen atom such as iodine, chlorine bromine or fluorine. Broadly speaking, the starting reactants are employed in approximately equivalent amounts and the reaction is effected in an inert solvent, preferably in an anhydrous aromatic hydrocarbon, for example, benzene, toluene, xylene, at a temperature range of about between 110° C. and 140° C. Typically, the reaction is carried out in boiling toluene or xylene.

The above described process is completely unexpected because there is no known process where the nitrogen atom in either sulfimines

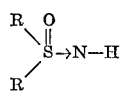

or sulfonamides

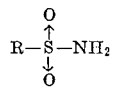

can be alkylated. More surprisingly, there is no known process whereby an alkyl, an aminoalkyl, or a substituted aminoalkyl radical can be directly substituted on the nitrogen atom of the sulfoximine group.

The free base thus obtained may be readily converted to the corresponding acid addition salt or quaternary ammonium salt by conventional methods. Exemplary of the acid addition salts are those formed with acetic, maleic, oxalic, fumaric, succinic, tartaric, citric, malic, cinnamic, sulfonic, hydrochloric, hydrobromic, sulfuric, phosphoric or nitric acid, and the like. The acid addition salts may be prepared in the conventional manner by treating a solution or suspension of the free base in an organic solvent such as ether with the desired acid, and then recovering the salts which form by crystallization techniques.

The quaternary salts are prepared by heating a suspension of the free base in a solvent such as acetonitrile with a reactive halide such as methyl iodide, ethyl bromide, n-hexyl bromide, benzyl chloride or a reactive ester such as methyl sulfate, ethyl sulfate, methyl p-toluene sulfonate, and the like.

The compounds of this invention exhibit a very intense and specific broncholytic-antispasmodic activity in mammals. Accordingly, these compounds are useful as antispasmodic and broncholytic agents in mammals such as mice, guinea pigs, cats, dogs, and the like who are suffering from bronchial spasms.

Broadly speaking, the compounds may be administered to these mammals orally, subcutaneously, intravenously, intragastricly or intraduodenally in an amount from about 0.5 to 120 mg./kg. body weight of the mammalian host being treated. In order to administer these compounds, they may be combined with pharmaceutically acceptable excipients such as lactose, sugar, mannitol, dicalcium phosphate and the like to form dosage forms such as tablets, pellets, coated tablets, capsules and the like. They may also be combined with parenterally acceptable vehicles such as water, oil and the like to form dosage forms suitable for parenteral injection. Additionally, these compounds may also be administered rectally by combining with excipients such as cocoa butter or a glycerin-gelatin base to form dosage forms such as suppositories. These compounds may also be formulated in the form of an aerosol suitable for inhalation therapy. These formulations, as well as various dosage forms, are compounded by methods known to the pharmacist's art.

Generally speaking, a dose of about 0.5 to 120 mg./kg. body weight may be prescribed to relieve bronchial spasms and this dose may be repeated 3 or 4 times a day. This dosage regimen may be varied according to body weight of the mammal being treated and may also be varied according to the species and the severity of the condition being treated.

In order to enhance and broaden the therapeutic spectrum, these compounds may be combined with other known pharmacodynamic agents in therapeutic amounts such as steroids, for example, β-methasone, dexa-methasone; sympathomimetic amines, for example, isoproterenol, ephedrines; antihistamines, for example, chlorpheniramine, promethazine; and antitussives, for example, dextro-methorphan, codeine and the like.

The following examples are included in order to further illustrate this invention. The temperatures are given in ° C.

EXAMPLE 1

N-[2-(diethylamino)ethyl]-S,S-diphenylfoximine and its oxalate

A solution of 0.1 mole of S,S-diphenylsulfoximine in 300 cc. of dry toluene is treated in portions with 0.1 mole of sodium hydride (a 50% oily suspension) a reaction in which the sodium salt of the sulfoximine deposits as a colorless precipitate. A solution of 0.15 mole of 2-diethylaminoethyl chloride in 50 cc. of dry toluene is added dropwise to the suspension while stirring, and the batch heated for 5 hours under reflux. Being cooled down the suspension is filtered, the toluene removed in vacuo and the oily residue is removed by distillation to yield 26.5 gm. of N-[2-(diethylamino)ethyl]-S,S-diphenylsulfoximine in the form of a viscid, yellow oil, having a B.P. of 170 to 175° C. at 0.5 mm. Hg. In the conventional manner the base is converted into the oxalate, which subsequently recrystallized from isopropanol/ethyl acetate. The acid oxalate is obtained in the form of colorless crystals, M.P. 106 to 107° C.

*Analysis.*—$C_{20}H_{26}N_2O_5S$ (406.5). Calculated (percent): C, 59.09; H, 6.45; N, 6.89; S, 7.89. Found (percent): C, 58.83; H, 6.41; N, 7.04; S, 7.72.

EXAMPLE 2

N-[3-(dimethylamino)propyl]-S,S-diphenylsulfoximine and its oxalate 0.15 mole of 3-dimethylaminopropyl chloride, dissolved in 50 cc. of dry toluene are added dropwise to a suspension of 0.1 mole of the sodium salt of diphenylsulfoximine in 300 cc. of dry toluene (prepared as in Example 1). The suspension is heated for 5 hours under reflux, cooled and filtered. After removing the toluene, the residue is distilled in vacuo. The free base is obtained as a yellow viscous oil fraction having B.P. of 165 to 175° C., at 0.05 mm. Hg, yield 24 gm. It is collected and converted into the acid oxalate. Upon recrystallization from isopropanol/ethyl acetate colorless crystals of M.P. 135° C. to 136° C. are yielded.

*Analysis.*—$C_{19}H_{24}N_2O_5S$ (392.5). Calculated (percent): C, 58.14; H, 6.16; N, 7.14; S, 8.17. Found (percent): C, 58.18; H, 5.94; N, 7.06; S, 7.84.

EXAMPLE 3

N-(2-piperidinoethyl)-S,S-diphenylsulfoximine and its oxalate

A solution of 0.12 mole of N-(2-chloroethyl)piperidine in 50 cc. of dry toluene is added dropwise with stirring to a suspension of 0.1 mole of the sodium salt of S,S-diphenylsulfoximine in 300 cc. of dry toluene; the suspension is heated for 3 hours to boiling, is filtered on cooling down, and the filtrate reduced. The residue crystallizes in petroleum ether to obtain 25 gm. of N - (2 - piperidinoethyl)-S,S-diphenylsulfoximine as colorless crystals, M.P. 98 to 99° C.

The acid oxalate is prepared conventionally and then recrystallized from isopropanol/ethanol. Its M.P. is 194 to 195° C. (dec.)

*Analysis.*—$C_{21}H_{26}N_2O_5S$ (418.5). Calculated (percent): C, 60.26; H, 6.26; N, 6.70; S, 7.66. Found (percent): C, 60.59; H, 6.29; N, 6.81; S, 7.52.

EXAMPLE 4

N-[2-(dimethylamino)propyl]-S,S-diphenylsulfoximine and its oxalate 0.1 mole of S,S-diphenylsulfoximine is added in portions to 0.1 mole of granulated potassium in 400 cc. of dry xylene while stirring. The addition being effected the suspension is heated for 30 minutes to boiling. Subsequently a solution of 0.12 mole of 2 - dimethylaminopropyl chloride in 50 cc. of dry xylene is added dropwise to the suspension of S,S-diphenylsulfoximine potassium and the mixture heated for 18 hours under reflux. It is filtered when cool. The xylene phase is reduced and the residue fractionated in vacuo to obtain N-[2-(dimethylamino)propyl]-S,S-diphenylsulfoximine have a B.P. of 157 to 160° C. at 0.01 mm. Hg. Yield: 23.5 gm.

The acid oxalate is obtained in the form of colorless crystals, M.P. 133 to 135° C. (recrystallized from isopropanol/ethyl acetate).

Analysis.—$C_{19}H_{24}N_2O_5S$. Calculated (percent): C, 58.14; H, 6.17; N, 7.14; S, 8.17. Found (percent): C, 58.09; H, 6.13; N, 7.40; S. 8.23.

EXAMPLE 5

N-(2-diethylaminoethyl)-S,S-diphenyl sulfoximine ethyl ethosulfate 0.1 mole of N-(2 - diethylaminoethyl)-S,S-diphenylsulfoximine and 0.11 mole of diethyl sulfate are heated for 4 hours under reflux in 150 cc. of acetonitrile. The solvent is then distilled off and the viscid residue recrystallized several times from ethyl acetate to which active charcoal has been added. Yield: 10 gm., M.P. 79 to 84° C.

Analysis.—$C_{22}H_{34}N_2O_5S_2$ (470.6). Calculated (percent): C, 56.14; H, 7.28; N, 5.95; S, 13.63. Found (percent): C, 55.91; H, 7.22; N, 5.85; S, 13.43.

EXAMPLE 6

N-[2-(diethylamino)ethyl]-S,S-diphenylsulfoximine 1,5-naphthalene disulfonate

Hot solutions of equivalent amounts of N-(2-diethylaminoethyl)-S,S-diphenylsulfoximine and 1,5 - naphthalene disulfonic acid in isopropanol are combined. While cooling down the above salt precipitates, which is recrystallized from ethanol. The colorless needles obtained have a M.P. of 208 to 209° C. The crystal product is stable and compatible from the physiological point of view.

Analysis.—$C_{23}H_{28}N_2O_4S_2$ (460.6). Calculated (percent): C, 59.97; H, 6.13; N, 6.08; S, 13.92. Found (percent): C, 60.23; H, 6.06; N, 6.05; S, 13.64.

EXAMPLE 7

N-[3-(diethylamino)-2,2-dimethylpropyl]-S,S-diphenylsulfoximine and its 1,5-naphthalene disulfonate 0.1 mole of diphenylsulfoximine potassium is treated with 0.12 mole of 1-chloro-3-diethylamino-2,2-dimethylpropane in anhydrous xylene according to Example 4 over a period of 16 hours to yield 22.2 gm. of N-[3-(diethylamino) - 2,2 - dimethylpropyl]-S,S-diphenylsulfoximine having a B.P. of 207 to 210° at 0.04 mm. Hg. By combining a solution of the base in isopropanol with a solution of 1,5-naphthalene disulfonic acid in the same solvent, 1,5-naphthalene disulfonate is yielded. It is purified by recrystallization from methanol. M.P. 232–233° C.

Analysis.—$C_{31}H_{38}N_2O_7S_3$ (646.8). Calculated (percent): C, 57.56; H, 5.92; N, 4.33; S, 14.87. Found (percent): C, 57.58; H, 5.89; N, 4.40; S, 14.64.

EXAMPLE 8

N-[2-(1-methyl-2-piperidyl)ethyl]-S,S-diphenylsulfoximine and its 1,5-naphthalene disulfonate As described in Example 4, the free base is prepared from 0.1 mole of diphenylsulfoximine potassium and 0.15 mole of 1-methyl-2-(2-chloroethyl)piperidine in anhydrous xylene over a 4-hour period to yield 28 gm. of N-[2-(1-methyl-2-piperidyl)ethyl] - S,S - diphenylsulfoximine having a B.P. of 180–205°.

The 1,5-naphthalene disulfonate is prepared in the usual way and recrystallized from n-propanol/water. The colorless needles have a M.P. of 300° C.

Analysis.—$C_{30}H_{34}N_2O_7S_3$ (630.8). Calculated (percent): C, 57.12; H, 5.43; N, 4.45; S, 15.25. Found (percent): C, 57.44; H, 5.48; N, 4.31; S, 14.94.

EXAMPLE 9

N-[2-(1-methyl-2-pyrrolidinyl)ethyl]-S,S-diphenylsulfoximine and its 1,5-naphthalene disulfonate·$H_2O$ Following the procedure of Example 1, 0.1 mole S,S-diphenylsulfoximine sodium is treated with 0.1 mole of 1-methyl-2-chloroethylpyrrolidine in anhydrous xylene over a 24-hour period to yield 23.4 gm. of N-[2-(1-methyl-2-pyrrolidinyl)ethyl]-S,S-diphenylsulfoximine having a B.P. of 185–205° C. at 0.02 mm. Hg.

Recrystallization of the 1,5-naphthalene disulfonate, which is prepared in the usual way, is effected from ethanol water. It contains 1 mole of crystallization water. M.P. 154°/190°.

Analysis.—$C_{29}H_{34}N_2O_8S_3$ (634.8). Calculated (percent): C, 54.87; H, 5.40; N, 4.41; S, 15.15. Found (percent): C, 54.96; H, 5.57; N, 4.59; S, 15.20.

EXAMPLE 10

N-(1-ethyl-3-piperidyl)-S,S-diphenyl-sulfoximine and its oxalate

According to the procedure of Example 1, 0.1 mole of S,S-diphenyl-sulfoximine sodium is treated with 0.12 mole of 1-ethyl-3-chloropiperidine in anhydrous xylene over a 5-hour period to yield 22.5 gm. of N-(1-ethyl-3-piperidyl)-S,S-diphenylsulfoximine having a B.P. of 170–190° C. at 0.1 mm. Hg.

The acid oxalate is prepared in the usual way and recrystallized from ethyl acetate/isopropanol. M.P. 129.5–130.5°.

Analysis.—$C_{21}H_{26}N_2O_5S$ (418.5). Calculated (percent): C, 60.26; H, 6.26; N, 6.69; S, 7.66. Found (percent): C, 60.39; H, 6.24; N, 6.55; S, 7.68.

EXAMPLE 11

N-[1,3-bis (dimethylamino)-2-propyl]-S,S-diphenylsulfoximine and its dioxalate

Following the procedure of Example 4, 0.1 mole of diphenylsulfoximine potassium is treated with 0.12 mole of 1,3-bis (dimethylamino)-2-chloropropane in anhydrous xylene to yield 9.6 gm. of N-[1,3-bis (dimethylamino)-2-propyl]-S,S-diphenylsulfoximine having a B.P. of 180–190° at 0.2 mm. Hg.

The di-oxalate—prepared in the usual manner—is recrystallized from isopropanol. M.P. 155–156°.

Analysis.—$C_{23}H_{31}N_3O_9S$. Calculated (percent): C, 52.56; H, 5.94; N, 8.00; S, 6.10. Found (percent): C, 52.52; H, 5.71; N, 8.02; S, 6.25.

EXAMPLE 12

N-[2-(3-azabicyclo(3.2.2)non-3-yl)ethyl]-S,S-diphenylsulfoximine hydrochloride

Following the procedure of Example 4, 0.1 mole of S,S-diphenylsulfoximine potassium is treated with 0.15 mole of 2-(3-azabicyclo(3.2.2)non-3-yl)ethyl chloride in anhydrous xylene over a 5-hour period to yield 27.5 gm. of N-[2-(3 - azabicyclo(3.2.2)non-3-yl)ethyl]-S,S-diphenylsulfoximine distilling at a B.P. of 195–230° C. 0.1 mm. Hg solidifies in the receiver and is recrystallized from diisopropylether. M.P. 112° C.

The hydrochloride is prepared as usual, and is recrystallized from ethyl-methyl ketone. M.P. 215–216°.

*Analysis.*—$C_{22}H_{29}ClN_2OS$ (405.0). Calculated (percent): C, 65.24; H, 7.22; Cl, 8.75; N, 6.92; S, 7.92. Found (percent): C, 65.21; H, 7.20; Cl, 8.89; N, 7.06; S, 8.19.

EXAMPLE 13

N-[2-(dimethylamino)ethyl]-S,S-diphenyl-sulfoximine and its oxalate

The free base is prepared from diphenyl-sulfoximine-sodium and dimethylaminoethyl chloride in dry toluene as described in Example 1 to yield 24.5 gm. of N-[2-(dimethylamino)ethyl]-S,S-diphenyl-sulfoximine having a B.P. of 155–165° at 0.1 mm. Hg.

The acid oxalate is prepared in the usual manner and recrystallized from isopropanol/ethyl acetate. It is obtained in the form of colorless crystals, M.P. 148–149°.

*Analysis.*—$C_{18}H_{22}N_2O_5S$ (378.5). Calculated (percent): C, 57.12; H, 5.86; N, 7.40; S, 8.47. Found (percent): C, 57.30; H, 5.79; N, 7.63; S, 8.46.

EXAMPLE 14

N-(2-pyrrolidinoethyl)-S,S-diphenyl-sulfoximine and its oxalate

Following the procedure of Example 4, the free base is prepared from 0.1 mole of diphenyl-sulfoximine-potassium and 0.2 mole of 2-chloroethylpyrrolidine in dry xylene. The reaction time is 5 hours. The base distilling at a B.P. of 185–205° at 0.15 mm. Hg solidifies in the receiver and is recrystallized from petroleum ether. Yield: 22.2 gm., M.P. 82–83°.

The acid oxalate is prepared in the usual way; upon recrystallization from isopropanol, its M.P. is 173–174°.

*Analysis.*—$C_{20}H_{24}N_2O_5S$ (404.5). Calculated (percent): C, 59.39; H, 5.98; N, 6.93; S, 7.93. Found (percent): C, 59.26; H, 5.96; N, 6.95; S, 7.88.

EXAMPLE 15

N-2-[(benzyl)methylamino]ethyl-S,S-diphenyl-sulfoximine and its oxalate 0.1 mole of diphenyl-sulfoximine-potassium are treated according to the procedure of Example 4 with 0.12 mole of N-benzyl-methylamino-ethyl chloride in dry xylene over a period of 24 hours. The crude base is converted into the acid oxalate, and this is recrystallized from isopropanol/ethanol. Yield: 32.2 gm., M.P. 170–171°.

*Analysis.*—$C_{24}H_{26}N_2O_5S$ (454.6). Calculated (percent): C, 63.41; H, 5.76; N, 6.16; S, 7.05. Found (percent): C, 63.06; H, 5.66; N, 6.24; S, 6.89.

EXAMPLE 16

N-(2-morpholinoethyl)-S,S-diphenyl-sulfoximine and its dihydrochloride 0.1 mole of diphenyl-sulfoximine-potassium are treated according to Example 4 with 0.2 mole of N-(2-chloroethyl)-morpholine in dry xylene over a period of 12 hours. The base (26.3 gm.) distilling at a B.P. of 150–205° at 0.02 mm. Hg solidifies in the receiver. Upon recrystallization from petroleum ether, its M.P. is 79–80° C.

The dihydrochloride is obtained by introducing hydrogen chloride into an ethereal solution of the base. It is recrystallized from butanol, M.P. 190–191°.

*Analysis.*—$C_{18}H_{24}Cl_2N_2O_2S$ (403.4). Calculated (percent): C, 53.59; H, 6.00; Cl, 17.58; N, 6.94; S, 7.95. Found (percent): C, 53.55; H, 6.04; Cl, 17.39; N, 7.00; S, 8.23.

EXAMPLE 17

N-[2-(dibenzylamino)ethyl]-S,S-diphenyl-sulfoximine 0.1 mole of diphenyl-sulfoximine-potassium are treated according to the procedure of Example 4 with 0.11 mole of N-(2-chloroethyl)-dibenzylamine in dry xylene over a period of 20 hours. After repeated recrystallization of the crude product from diisopropylether/petroleum ether 13 gm. of the pure N-[2-(dibenzylamino)ethyl]-S,S-diphenyl-sulfoximine is yielded, M.P. 85.5°.

*Analysis.*—$C_{28}H_{28}N_2OS$ (440.6). Calculated (percent): C, 76.32; H, 6.40; N, 6.36; S, 7.28. Found (percent): C, 76.44; H, 6.21; N, 6.08; S, 7.34.

EXAMPLE 18

N-[2-(4-benzyl-piperazino)ethyl]-S,S-diphenyl-sulfoximine and its oxalate 0.1 mole of diphenyl-sulfoximine-potassium are treated in dry xylene with 0.12 mole of 1-benzyl-4-(2-chloroethyl)-piperazine following the procedure of Example 4. Reaction time is 15 hours. The crude N-[2-(4-benzyl-piperazino)ethyl]-S,S-diphenyl-sulfoximine is purified by recrystallization from petroleum ether, M.P. 76–77.5°.

The oxalate which is prepared in the usual manner is recrystallized from ethanol/dimethyl-formamide and shows a M.P. of 230° (dec.). Yield: 25 gm.

*Analysis.*—$C_{29}H_{33}N_3O_9S$ (599.7). Calculated (percent): C, 58.08; H, 5.54; N, 7.01; S, 5.34. Found (percent): C, 58.44; H, 5.54; N, 6.86; S, 5.41.

The compound N-(2-diethylaminoethyl)-S,S-diphenyl-sulfoximine oxalate, designated as Compound 1 in the following example, is employed to demonstrate the pharmacologic properties which are characteristic of the entire group of compounds obtainable according to the invention.

EXAMPLE 19

Determination of the toxicity of Compound 1 as well as of theophylline and ephedrine which were used as standard substances Experimental animals were male mice (NMRI strain) weighing 17 to 21 gm. The animals fasted 24 hours prior to the trial. Water was offered ad libitum.

The substances under investigation were administered in increasing doses to groups consisting of 6 animals by using a gastric tube. The animals were observed over a period of 24 hours. The $LD_{50}$ with its pertinent confidential limits were determined according to the method of Litchfield and Wilcoxon (Therap. Grundlagen der experimentellen Arzneimittel-forschung—Ther. Fundamentals of Experimental Drug Research—1965, page 82).

The findings were compiled in the following table:

| Substance | $LD_{50}$, mg./kg., i. g. | Confidential limits, $p=0.05$ | |
|---|---|---|---|
| | | Upper, mg./kg. | Lower, mg./kg. |
| Compound 1 | 188 | 223 | 158 |
| Theopylline | 290 | 338 | 248 |
| Ephedrine | 470 | 635 | 348 |

The following manifestations were observed:

After 50 mg./kg. of Compound 1, the behavior of the animals was normal. After 50 mg./kg. of theophylline, again no particular manifestations were observed. After 50 mg./kg. of ephedrine, the animals demonstrated prone position, accelerated respiration, piloerection, and exophthalmus. At higher doses significant manifestations were observed with all substances: prone position, and heavily depressed spontaneous motility with Compound 1, ptosis and again prone position with theophylline, and stimulation of the central nervous system, caudal phenomenon, and salivation with ephedrine.

Antiasthmatic activity

*Experimental method.*—The method described by Konzett and Roessler was employed (Arch. exp. Path. Pharmak., 195,71 (1940)).

Experimental animals were guinea pigs weighing between 280 and 380 gm. Under urethane narcosis (1.5 gm./kg. i.m.) and their chests opened, the animals received artificial respiration by means of a respiratory pump. The respiratory pressure was adjusted by a mercury manometer. Every 4 minutes a bronchospasm was caused by intravenous application (vena jugularis) of spasmodics; these were acetyl choline, histamine, and serotonin. Two minutes prior to the injection of a spasmodic, the substances under investigation were administered, i.e. again by intravenous injection.

These were the findings:

Only after 16 mg./kg. of theophylline a moderate broncholytic activity was achieved, with the bronchospasm not being suppressed but only mitigated in most of the experiments.

Up to doses of 32 gm./kg., ephedrine showed no spasmolytic action on any of the spasmodics used.

Compound 1 is already highly active at doses of 0.5 mg./kg. and/or 1 mg./kg. given intravenously. Upon employment of all spasmodics the bronchospasms were suppressed over a long period. Even after intragastric and intraduodenal application Compound 1 is extremely effective.

The $LD_{50}$ of Compound 1 is, as mentioned above, 188 mg./kg. Median therapeutic effects can already be observed after 0.5 and/or 1 mg./kg.; hence follows a therapeutic index of 94 to 188. In the majority of experiments theophylline shows therapeutic effects corresponding to those of 1 mg./kg. of Compound 1, if a dose of 16 mg./kg. was administered. With an $LD_{50}$ of 290 mg./kg. the therapeutic index for theophylline is approximately 18.

As can be seen from the above results, no therapeutic effect was achieved with ephedrine when using the chosen experimental methods so the therapeutic index could not be calculated; in any case, however, this is below 15.

It is understood that the foregoing detailed description is given merely by way of illustration and that many variations may be made therein without departing from the spirit of our invention.

Having described our invention, what we desire to secure by Letters Patent is:

1. A compound selected from the group consisting of a free base of the formula:

$$O=\overset{C_6H_5}{\underset{C_6H_5}{S}}=N-R \qquad I$$

wherein R is a member selected from the group consisting of

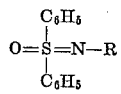

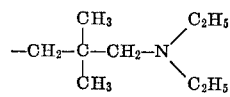

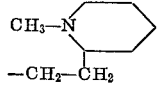

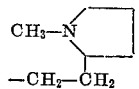

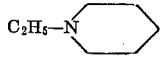

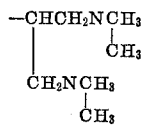

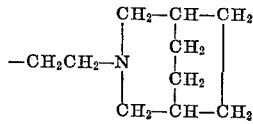

and

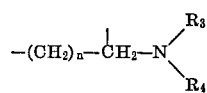

in which $R_3$ and $R_4$ are each a member selected from the group consisting of lower alkyl of one to seven carbon atoms and benzyl and $R_3$ and $R_4$ taken together with the nitrogen atom to which they are attached form pyrrolidino, piperidino, morpholino or 4-benzyl piperazino, n is 1 or 2; and the pharmaceutically acceptable acid addition and quaternary ammonium salts thereof.

2. The compound of claim 1 which is N-(2-diethylaminoethyl)-S,S-diphenyl-sulfoximine and its corresponding pharmaceutically acceptable acid addition and quaternary ammonium salts thereof.

3. The compound of claim 1 which is N-(3-dimethylaminopropyl)-S,S-diphenyl-sulfoximine and its pharmaceutically acceptable acid addition and quaternary ammonium salts thereof.

4. The compound of claim 1 which is N-(2-piperidinoethyl)-S,S-diphenyl-sulfoximine and its corresponding pharmaceutically acceptable acid addition and quaternary ammonium salts thereof.

5. The compound of claim 1 which is N-(2-dimethylaminopropyl)-S,S-diphenyl-sulfoximine and its corresponding pharmaceutically acceptable acid addition and quaternary ammonium salts thereof.

6. The compound of claim 1 which is n-[3-(diethylamino) - 2,2 - dimethylpropyl] - S,S - diphenyl - sulfoximine and its corresponding pharmaceutically acceptable acid addition and quaternary ammonium salts thereof.

7. The compound of claim 1 which is N-[2-(1-methyl-2-piperidyl)ethyl]-S,S-diphenyl-sulfoximine and its corresponding pharmaceutically acceptable acid addition and quaternary ammonium salts thereof.

8. The compound of claim 1 which is N-[2-(1-methyl-2-pyrrolidinyl)ethyl] - S,S - diphenyl - sulfoximine and its corresponding pharmaceutically acceptable acid addition and quaternary ammonium salts thereof.

9. The compound of claim 1 which is N-(1-ethyl-3-piperidyl)-S,S-diphenyl-sulfoximine and its corresponding pharmaceutically acceptable acid addition and quaternary ammonium salts thereof.

10. The compound of claim 1 which is N-[1,3-bis(dimethylamino) - 2 - propyl] - S,S - diphenyl - sulfoximine and its corresponding pharmaceutically acceptable acid addition and quaternary ammonium salts thereof.

11. The compound of claim 1 which is N-[2-(3-azabicyclo(3.2.2)non - 3 -yl)ethyl] - S,S - diphenyl - sulfoximine and its corresponding pharmaceutically acceptable acid addition and quaternary ammonium salts thereof.

12. The compound of claim 1 which is N-[2-(dimethylamino)ethyl]-S,S-diphenyl-sulfoximine and its corresponding pharmaceutically acceptable acid addition quaternary ammonium salts thereof.

13. The compound of claim 1 which is N-(2-pyrrolidinoethyl)-S,S-diphenyl-sulfoximine and its corresponding pharmaceutically acceptable acid addition and quaternary ammonium salts thereof.

14. The compound of claim 1 which is N-2-[(benzyl)methylamino]ethyl - S,S - diphenyl - sulfoximine and its corresponding pharmaceutically acceptable acid addition and quaternary ammonium salts thereof.

15. The compound of claim 1 which is N-(2-morpholinoethyl)-S,S-diphenyl-sulfoximine and its corresponding pharmaceutically acceptable acid addition and quaternary ammonium salts thereof.

16. The compound of claim 1 which is N-[2-(dibenzylamino)ethyl]-S,S-diphenyl-sulfoximine and its corresponding acid addition and quaternary ammonium salts thereof.

17. The compound of claim 1 which is N-[2-(4-benzylpiperazino)ethyl]-S,S-diphenyl-sulfoximine and its corresponding pharmaceutically acceptable acid addition and quaternary ammonium salts thereof.

18. A process for the production of the free base according to claim 1 which comprises contacting a compound of the formula

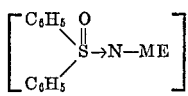  III with a compound of the formula

Hal—R   VI wherein "ME" is an alkali metal and "Hal" is halogen, in an anhydrous aromatic hydrocarbon solvent at a temperature of about between 110°–140° C.

19. A process according to claim 18 wherein said aromatic hydrocarbon solvent is a member selected from the group consisting of xylene and toluene.

20. A process according to claim 18 wherein compounds III and IV are employed at approximately equivalent amounts.

No references cited.

ALEZ MAZEL, Primary Examiner

J. TOVAR, Assistant Examiner

U.S. Cl. X.R.

260—247.1, 268, 293.4, 326.82, 551; 424—244, 248, 250, 267, 274